(12) United States Patent
Sharma

(10) Patent No.: US 10,675,990 B2
(45) Date of Patent: Jun. 9, 2020

(54) DRONE DOCKING SYSTEM

(71) Applicant: Anuj Sharma, Ames, IA (US)

(72) Inventor: Anuj Sharma, Ames, IA (US)

(73) Assignee: Anuj Sharma, Ames, IA (US)

( * ) Notice: Subject to any disclaimer, the term of this patent is extended or adjusted under 35 U.S.C. 154(b) by 287 days.

(21) Appl. No.: 15/950,316

(22) Filed: Apr. 11, 2018

(65) Prior Publication Data

US 2018/0290554 A1 Oct. 11, 2018

Related U.S. Application Data

(60) Provisional application No. 62/484,054, filed on Apr. 11, 2017.

(51) Int. Cl.
| | |
|---|---|
| *B60L 53/60* | (2019.01) |
| *B64C 39/02* | (2006.01) |
| *B60L 53/16* | (2019.01) |
| *B60L 53/35* | (2019.01) |
| *G01S 13/91* | (2006.01) |

(52) U.S. Cl.
CPC ............... *B60L 53/60* (2019.02); *B60L 53/16* (2019.02); *B60L 53/35* (2019.02); *B64C 39/024* (2013.01); *B60L 2200/10* (2013.01); *B64C 2201/042* (2013.01); *B64C 2201/066* (2013.01); *G01S 13/913* (2013.01)

(58) Field of Classification Search
CPC .......... B60L 53/60; B60L 53/35; B60L 53/16; B60L 2200/10; B64C 39/024; B64C 2201/066; B64C 2201/042; G01S 13/913
See application file for complete search history.

(56) References Cited

U.S. PATENT DOCUMENTS

| | | | | |
|---|---|---|---|---|
| 6,030,006 | A * | 2/2000 | Lin | F16L 23/10 24/279 |
| 9,774,221 | B1 * | 9/2017 | Holland | H02K 1/06 |
| 2013/0145994 | A1 * | 6/2013 | Lash | A01K 27/009 119/796 |
| 2016/0083980 | A1 * | 3/2016 | Lash | E05B 75/00 70/17 |
| 2016/0107750 | A1 * | 4/2016 | Yates | B64C 39/024 244/2 |
| 2016/0221688 | A1 * | 8/2016 | Moore | B64F 1/00 |
| 2016/0314545 | A1 * | 10/2016 | Jessen | G06Q 30/0278 |
| 2016/0318607 | A1 * | 11/2016 | Desai | B64D 1/16 |

(Continued)

*Primary Examiner* — Assres H Woldemaryam
(74) *Attorney, Agent, or Firm* — Zarley Law Firm, PLC

(57) ABSTRACT

A drone docking system is disclosed that is connected to a drone. The drone docking system has a positioning member that connects to the drone and is configured to rotate the angle of the drone from a generally horizontal position to a generally vertical position. Connected to the positioning member is a charging member, which in one embodiment has a charging prong. The charging member is configured to connect to a power source, such as one located on existing infrastructure, e.g., a street light. A connection member is connected to the charging member. The connection member engages existing infrastructure to hold the drone in place. In one arrangement, the connection member has a pair of arcuate arms that receive, retain, and hold onto the existing infrastructure. In one example, the pair of arcuate arms are spring biased to apply a gripping pressure on the existing infrastructure.

17 Claims, 3 Drawing Sheets

(56) References Cited

U.S. PATENT DOCUMENTS

2017/0356799 A1\* 12/2017 Beyeler ................ B64C 39/024
2018/0089622 A1\*  3/2018 Burch .................... G01S 19/49
2018/0117980 A1\*  5/2018 Lacaze ................... B64C 27/08

\* cited by examiner

DRONE DOCKING SYSTEM

CROSS REFERENCE TO RELATED APPLICATION

This application claims the benefit to U.S. Application No. 62/484,054 filed Apr. 11, 2017, incorporated by reference herein.

BACKGROUND OF THE INVENTION

This invention is directed to a docking system for a drone and more particularly a docking system that permits the drone to recharge, monitor a situation, and/or connect to a network to transmit data.

Drones are well known in the art. Presently, because of a limited power supply, drones have a limited range. They also are required to be manually operated unless connected or tethered to a structure. These limitations make many applications such as long haul delivery, traffic monitoring and the like, difficult, if not impossible, to perform due to the finite amount of power available for flight or collection, computation, and transmission of information. Therefore, a need exists in the art for a system that addresses these deficiencies along with other objectives, features, and advantages of the invention will become apparent from the specification and claims.

SUMMARY OF THE INVENTION

In general, the present invention relates to a drone docking system. The drone docking system has a positioning member that connects to the drone and is configured to rotate the angle of the drone from a generally horizontal position to a generally vertical position. Connected to the positioning member is a charging member, which in one embodiment has a charging prong. The charging member is configured to connect to a power source, such as one located on existing infrastructure, e.g., a street light. A connection member is connected to the charging member. The connection member engages existing infrastructure to hold the drone in place. In one arrangement, the connection member has a pair of arcuate arms that receive, retain, and hold onto the existing infrastructure. In one example, the pair of arcuate arms are spring biased to apply a gripping pressure on the existing infrastructure.

DETAILED DESCRIPTION

Figure 1:
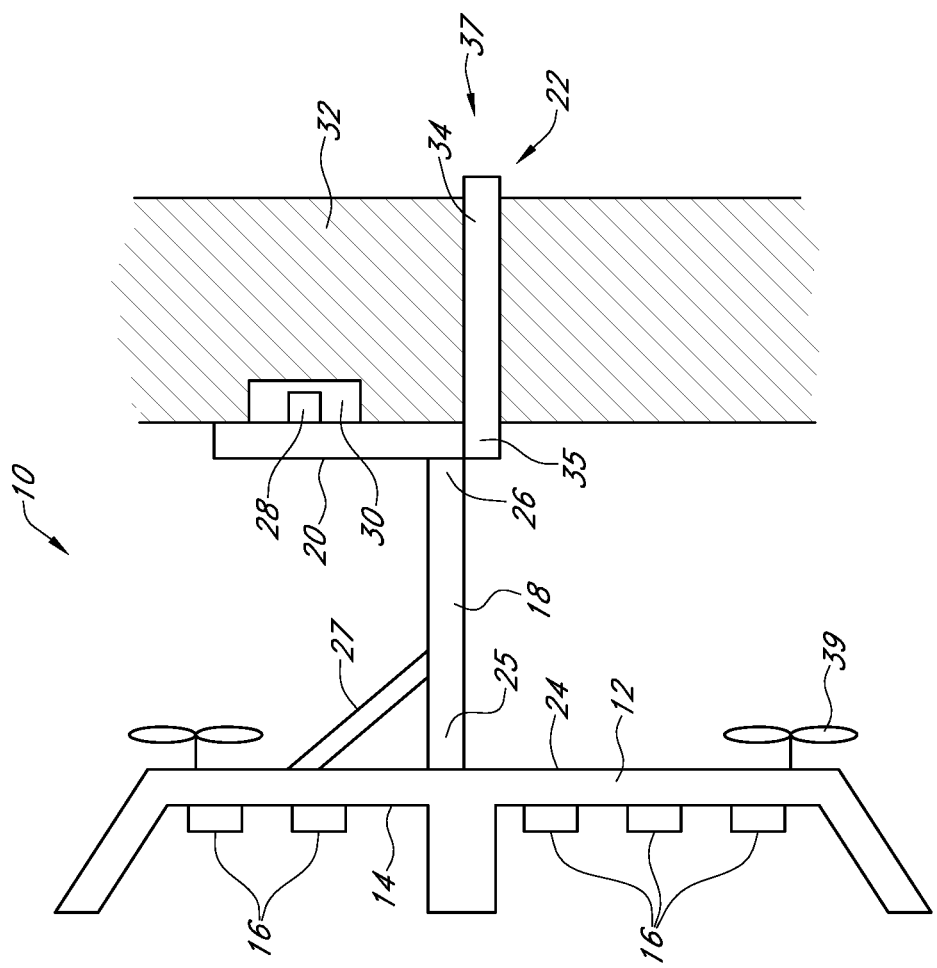
FIG. 1 is a side view of a drone docking system.
Figure 2:
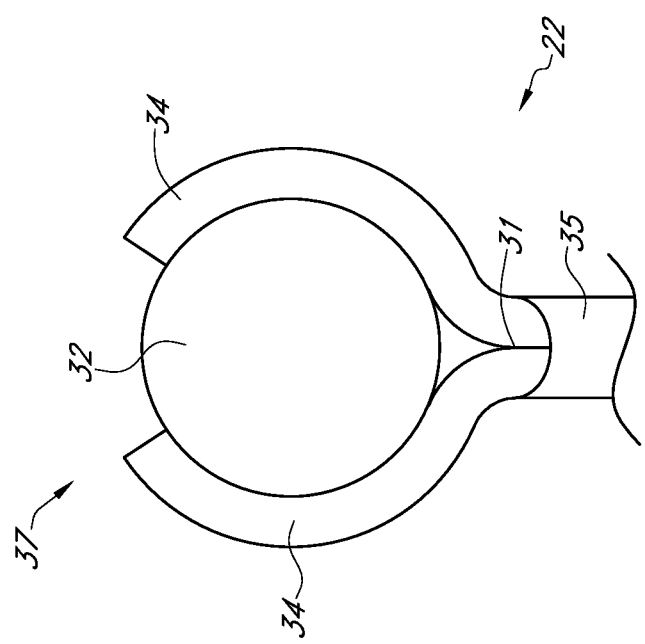
FIG. 2 is a top view of a connection member of a drone docking system.
Figure 3:
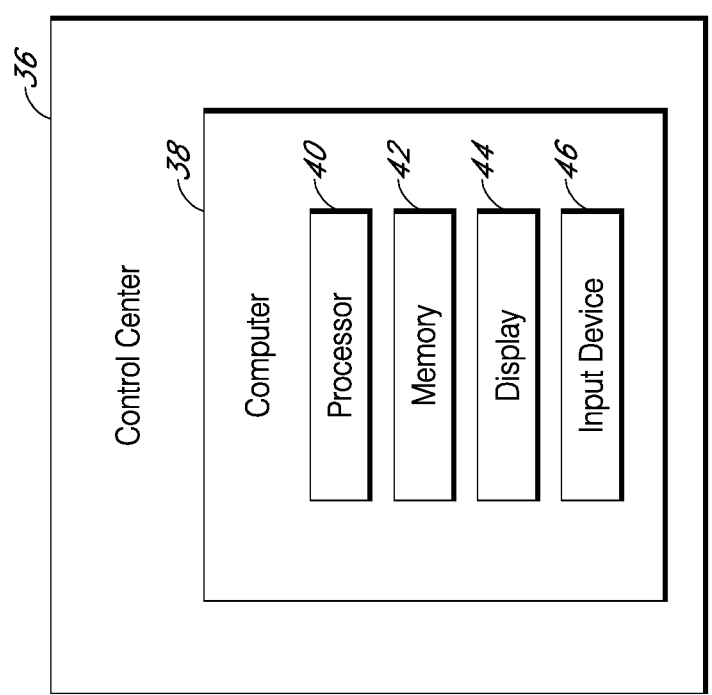
FIG. 3 is a diagram of a drone docking system.

Referring to the Figures, a drone docking system 10 is used in relation to a drone 12. The drone 12 is of any type and the docking system 10 is either manufactured as part of the drone 12 or is retrofitted to connect to the drone 12. On the lower surface 14 of the drone 12, are a plurality of sensors 16. The sensors 16 are of any type such as a camera, radar, or the like.

The docking system 10 includes a positioning member 18, a charging member 20, and a connection member 22. The positioning member 18 is pivotally connected to a top surface 24 of the drone 12 at a first end 25. In one embodiment, an actuator 27 is connected to and extends between the top surface 24 of the drone 12 and the positioning member 18.

Connected to a second end 26 of the positioning member 18 is a charging member 20. The charging member 20 is of any type. In one embodiment the charging member 20 is generally perpendicular to the positioning member 18 and includes a charging prong 28. The charging prong 28 is positioned to selectively align with and be received by a power source 30 such as an electrical socket or the like. The power source 30 is mounted to or is part of existing infrastructure 32 such as a light pole or the like.

Connected to the charging member 20 is the connection member 22. The connection member 22 is of any size, shape, and structure. In one example, the connection member 22, which is generally perpendicular to the charging member 20, is comprised of a pair of arcuate arms 34 that are pivotally connected at one end 35 and are spring biased to be partially opened at an opposite end 37, which is accomplished by a spring 31 in one arrangement.

In operation, the drone 12, either manually or automatically, is flown to a desired location adjacent the power source 30 of the infrastructure 32. The drone 12 is first positioned so that the charging prong 28 of the charging member 20 aligns with the power source 30. The drone 12 is then directed toward the power source 30 such that prong 28 is received within the power source 38. The charging prong 28 may be magnetic to more easily attach to the power source 30 and the network.

The drone 12 also is adapted to mount to a non-charging structure with a latch on mechanism or the like. When mounted to a non-charging station the drone motors are shut down and scene monitoring is conducted form a static position for long hours.

As the drone 12 is moved toward the power source 30, the connecting arms 34 engage the infrastructure 32 at the partial opening of the opposite end 37. The opposite end is opened to receive the infrastructure 32. In one arrangement, the connecting arms 34 partially or entirely wrap around the infrastructure 32. The spring bias of the connecting arms 34 applies a squeezing pressure to the infrastructure 32 thereby frictionally engaging the infrastructure 32, which holds the drone 12 in position. The connecting arms 34 may also include rare earth magnets to improve the connection. Before, during, or after the engagement between the connecting arms 34 and the infrastructure, the charging prong 28 is received within the power source 30.

Once connected to the infrastructure 32, the drone 12 is shut down, which in some embodiment results in one or more propellers 39 stopping. Then the positioning member 18 is activated. During activation, the positioning member 18 rotates the drone 12 from a generally horizontal position to a generally vertical position. In the generally vertical position the sensors 16 continue to detect and transmit information to a central control center 36, having a computer 38, having a processor 40, memory 42, display 44, and input device 46.

In one embodiment, the positioning on the drone 10 generally vertically allows for the monitoring of traffic while providing a constant source of power to the drone 12 to avoid interruptions in monitoring. In this embodiment, the sensors 16 transmit information to the computer 38 which then processes the information and then displays information using known algorithms to monitor traffic accidents, determine how a road is clearing out (i.e. the queue), monitor the effect on traffic of a work zone, provide a time line, and the like.

Accordingly, a drone docking system 10 has been disclosed that at the very least meets all the stated objectives.

From the above discussion and accompanying figures and claims it will be appreciated that the drone docking system 10 offers many advantages over the prior art. It will be appreciated further by those skilled in the art that other various modifications could be made to the device without parting from the spirit and scope of this invention. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A drone docking system comprising:
    a positioning member configured to connect to a drone at a first end;
    a charging member connected to the positioning member at a second end, wherein the charging member has a charging prongs configured to be received within and connect to a power source; and
    a connection member connected to the charging member.

2. A drone docking system comprising:
    a drone;
    a positioning member pivotally connected at a first end to the drone;
    a charging member connected to a second end of the positioning member;
    a charging prong positioned to selectively align with a power source connected to the charging member; and
    a connection member connected to the charging member and having a pair of arcuate arms.

3. The system of claim 2 further comprising a plurality of sensors connected to a bottom surface of the drone.

4. The system of claim 2 further comprising an actuator connected to the top surface and the positioning member.

5. The system of claim 2 wherein the power source is mounted to an existing infrastructure.

6. The system of claim 2 wherein the charging member extends substantially perpendicular to the positioning member.

7. The system of claim 2 wherein the connection member extends substantially perpendicular to the charging member.

8. The system of claim 2 wherein the pair of arcuate arms are pivotally connected at one end and are partially open on an opposite end.

9. The system of claim 8 wherein the pair of arcuate arms have a spring bias at the one end to partially open the pair of arcuate arms at the opposite end.

10. The system of claim 9 wherein the pair of arcuate arms are configured to receive an existing infrastructure and apply a squeezing pressure to frictionally engage the existing infrastructure, such that the connection member holds the drone in place.

11. The system of claim 2 wherein the charging prong is magnetic.

12. The system of claim 2 further comprising the pair of arcuate arms having at least one magnet.

13. A drone docking system comprising:
    a drone;
    a positioning member pivotally connected at a first end to the drone, wherein the positioning member is configured to rotate the drone from a generally horizontal position to a generally vertical position;
    a charging member connected to a second end of the positioning member;
    a charging prong positioned to selectively align with a power source connected to the charging member; and
    a connection member connected to the charging member and having a pair of arcuate arms configured to receive, retain, and hold an existing infrastructure.

14. The system of claim 13 further comprising the drone having at least one sensor configured to detect and transmit information related to traffic.

15. The system of claim 14 wherein the at least one sensor transmits information to a central control center having a computer.

16. The system of claim 13 wherein the pair of arcuate arms are connected at one end of the connection member and have a partial opening at an opposite end.

17. The system of claim 13 wherein the drone is adapted to mount to a non-charging structure for static scene monitoring.

* * * * *